United States Patent [19]
Iwata et al.

[11] Patent Number: 5,327,718
[45] Date of Patent: Jul. 12, 1994

[54] GAS TURBINE APPARATUS AND METHOD OF CONTROL THEREOF

[75] Inventors: Naohiko Iwata, Hitachi; Yasuhiko Otawara, Katsuta; Akira Shimura, Hitachi; Nobuyuki Iizuka, Hitachi; Isao Sato, Hitachi; Fumiyuki Hirose, Hitachi; Minoru Takaba, Hitachi; Yasutaka Komatsu, Hitachi; Hiraku Ikeda; Takeshi Iwamiya, both of Katsuta; Takeshi Ishida, Hitachi, all of Japan

[73] Assignee: Hitachi, Ltd., Tokyo, Japan

[21] Appl. No.: 933,317

[22] Filed: Aug. 21, 1992

[30] Foreign Application Priority Data

Aug. 23, 1991 [JP] Japan .................................. 3-212367

[51] Int. Cl.$^5$ .............................................. F02C 9/00
[52] U.S. Cl. .................................... 60/39.03; 60/39.27
[58] Field of Search ............... 60/39.03, 39.06, 39.23, 60/39.27, 39.29

[56] References Cited

U.S. PATENT DOCUMENTS

| | | | |
|---|---|---|---|
| 4,138,842 | 2/1979 | Zwick et al. | 60/39.29 |
| 4,683,715 | 8/1987 | Iizuka et al. | 60/39.06 |
| 4,720,970 | 1/1988 | Hudson et al. | |
| 5,024,055 | 6/1991 | Sato et al. | 60/39.27 |
| 5,069,029 | 12/1991 | Kuroda et al. | 60/39.06 |
| 5,121,597 | 6/1992 | Urushidani et al. | 60/39.06 |

FOREIGN PATENT DOCUMENTS

| | | |
|---|---|---|
| 0244344 | 4/1987 | European Pat. Off. . |
| 0278699 | 5/1988 | European Pat. Off. . |
| 92326 | 7/1981 | Japan .................. 60/39.281 |
| 894054 | 10/1958 | United Kingdom . |
| 2239056 | 10/1989 | United Kingdom . |

OTHER PUBLICATIONS

Patent Abstracts of Japan, Publication No. JP59120330, Pub. Date Jul. 25, 1984, Application No. JP83004122.
Patent Abstracts of Japan Vo. 11, No. 21 (M-555) (2468) Application No. 61-195214 (Aug. 29, 1986).
Patent Abstracts of Japan vol. 3 No. 94 (M293 Apr. 28, 1984 Japanese App. No. 59-7739 Jan. 14, 1984.

*Primary Examiner*—Louis J. Casaregola
*Attorney, Agent, or Firm*—Antonelli, Terry, Stout & Kraus

[57] ABSTRACT

A gas turbine apparatus has a gas turbine and a plurality of burners for providing combustion gas to drive the turbine. A flow control means of each burner for fuel or combustion air is adjusted by control means to control each said burner individually in dependence on a predetermined combustion characteristic of the respective burner. Sensed quantities relating to the combustion performance of the burners are input to the control means which adjusts the flow control means of each burner in dependence on the sensed quantities and the predetermined combustion characteristic of the respective burner.

12 Claims, 10 Drawing Sheets

GAS TURBINE APPARATUS AND METHOD OF CONTROL THEREOF

BACKGROUND OF THE INVENTION

1. Field of the Invention

This invention relates to gas turbine apparatus having a gas turbine and a plurality of burners which burn fuel in combustion air to supply combustion gases to drive the gas turbine. The invention is particularly concerned with the control of the burners, particularly the fuel-air ratio of the burner or of an individual stage of the burner, and thus also provides methods of control or operation of a gas turbine having a plurality of burners.

2. Description of Prior Art

Large power output gas turbines are nowadays usually supplied with combustion gas by a plurality of burners, which are often arranged in a ring, with each burner supplying its combustion gas to a different part of the first stage of the turbine. A number of proposals for control of the burners in such an apparatus have been made in the prior art, and include methods of pre-setting the burners for operation, and also adjusting the burners collectively or even separately during operation. Such methods are generally concerned with control of the fuel-air ratio.

One arrangement for setting the fuel-air ratio of a pre-mixing combustion stage of a plurality of burners is described in JP-A-61-195214. A pre-mixing combustion stage is one in which the fuel and combustion air meet and pass along a passage in which they are pre-mixed before reaching a combustion zone. This device is illustrated in FIGS. 7 to 9 of the accompanying drawings.

FIG. 8 show the burners 3 arranged in a ring to supply combustion gases to one gas turbine 1, whose inlet stage 1a is seen in FIG. 7. Each burner 3 as shown in FIG. 8 includes a diffusion combustion chamber 7a in which diffusion combustion having high combustion stability is effected, and a pre-mixing combustion chamber 6a in which pre-mixing combustion having a high $NO_x$ reduction ratio is effected. However, in the pre-mixing combustion, the combustion stability range is relatively narrow.

Diffusion fuel nozzles 9 for injecting a primary fuel F1 into the diffusion combustion chamber 7a are disposed at the upstream end of the diffusion combustion chamber 7a. Air A1 for the diffusion combustion enters through openings 7b. A pre-mixing gas formation chamber or passage 23 for pre-mixing a secondary fuel F2 and air A2, with pre-mixing fuel nozzles 19 for injecting the secondary fuel F2, is disposed at the up-stream end of the pre-mixing combustion chamber 6a. A movable member 28 of an inter-flow control device (hereinafter referred to as "IFC") is disposed near the inlet of the pre-mixing chamber 23 in order to regulate the rate of the combustion air flowing into the chamber 23 from the space between a burner casing 18 and a transition piece 105 and between the burner casing 18 and a cylinder 6 bounding the pre-mixing combustion region 6a. The air is supplied into this space as a flow A from a compressor 1.

The IFC device comprises the movable member 28, an IFC opening setter 29a for determining the amount of opening of the movable piece 28 and an IFC driving mechanism 17a for driving the movable member 28. One IFC opening setter 29a is provided for the plurality of burners 3. As shown in FIGS. 8 and 9, the IFC driving mechanism 17a comprises a control ring 45 disposed around the outside of the annular ring of burners 3, a hydraulic cylinder 46 for rotating this control ring 45 and a lever link mechanism 47 for driving the movable member 28 of each burner 3 in accordance with the operation of the control ring 45. The movable member 28 of the IFC device and the lever link mechanism 47 are provided for each of the burners 3, but other parts are in common for all the burners 3. In FIGS. 8 and 9, the arrows indicate the movement of the parts in the opening (O) and closing (C) directions.

As another means for adjusting the air distribution inside the burner, it is known to provide a bypass valve 104 for passing part of combustion air, supplied from the compressor to the gap between the gas turbine casing 18 and the transition piece 105, directly into the transition piece 105 as shown in FIG. 10. In the same way as in FIGS. 7 to 9 described above, only one bypass valve opening setter 100a, one motor and one control ring 102, etc, constituting the bypass valve driving device 100a are provided, to control all the bypass valves 104 of all the burners 3a, respectively. A link mechanism 103 for driving the bypass valve 104 in accordance with the operation of the control ring 102 is arranged for each bypass valve 104.

As for control of the fuel-air ratio (the proportion of the fuel to air) in such a gas turbine equipment, the fuel-air ratio has been set to a constant value by changing the flow rate of air in accordance with the flow rate of the fuel that is predetermined for the operation of the gas turbine as described in JP-A-60-66020 for example. In this case, the air flow rate is determined only on the basis of the fuel flow rate which is in match with the gas turbine load. Determination of the air flow rate based on only the fuel flow rate has been practised in other gas turbine equipments.

In such conventional gas turbines one control ring 45, 102 is driven for a plurality of burners. Therefore, the control of the fuel-air ratio for each burner individually cannot be made.

A proposal for the separate control of each burner has been made in JP-A-59-7739, which shows fuel control for each burner performed, on the basis of the sensed temperature at the inlet to the first stage of the gas turbine. Each burner is controlled in dependence on the temperature pattern sensed all around the turbine, so as to minimize the temperature differences measured around the gas turbine, resulting from different performance of the burners, by means of feed back from the sensed temperatures. Overall improvement of the performance of the gas turbine, particularly in respect of a reduction of nitrogen oxide content in the exhaust gas and of stability of the burner operation, was not under consideration. This method also does not control each burner in dependence on a performance characteristic thereof.

In U.S. patent application Ser. No. 5,024,055, there is described a device for gas turbine control in which sensors are provided at the outlet of the turbine, to detect the presence of unburned gas components in the exhaust gas. Such unburned components suggest that one or more of the burners is operating incorrectly or has blown out, and from the angular position of such unburned components, is possible to determine which burner is in such a condition. The proposal then is to adjust the flow rate of air and/or of fuel to the respective burner, in order to maintain the fuel flow rate above a certain minimum and the air flow rate below a certain maximum.

A proposal for separate control of two rings of burners on the basis of detected fuel calorific value has been made in EP-A-278699.

SUMMARY OF THE INVENTION

The present inventors have taken into consideration the fact that the parts which constitute each burner, for example the nozzles, the cylinders surrounding the combustion chambers, etc, vary in production and assembly, so that each burner has its own specific and particular inherent fuel-air ratio characteristics. It follows that the fuel-air ratio which is most suitable for one burner is not necessarily the most suitable for another burner, so that a given burner may not be operating at the most suitable fuel-air ratio for stable operation and for reduction of $NO_x$. It must be remembered that in the pre-mix combustion stage of a burner, which is the most efficient stage from the point of view of reduction of $NO_x$, there is a rather narrow stable combustion range, outside which the burner may tend to blow out. The present invention seeks to solve this problem, which was not appreciated in the prior art.

A first object of the invention is to provide a gas turbine apparatus and a method of controlling such an apparatus, in which stable operation of all of the burners is combined with a satisfactory level of $NO_x$ reduction. Particularly the invention provides improved control of the fuel-air ratio in each burner among a plurality of burners supplying the gas turbine.

In a first aspect, the invention provides a method and an apparatus in which the control of the fuel and/or air flow to the burners is effected individually for each burner, in dependence on at least one predetermined combustion characteristic of each burner. The combustion characteristic of each burner is determined in advance, and is specific for the burner. The combustion characteristic relates the fuel or air flow rate to the burner to a specific variable quantity related to the combustion performance of the burner. The measure of combustion performance may for example be the flame temperature in the combustion chamber of the burner. The specific quantity related to this performance may be a quantity which is the same for all the burners, e.g. the calorific value of the fuel, the humidity of the combustion air or the $NO_x$ content of the exhaust gas of the turbine. Alternatively, the quantity related to the combustion performance may be specific for the burner, and may be sensed individually for each burner, such as the actual combustion air flow rate of at least one stage of the burner, the combustion pressure in the burner (or the pressure fluctuation which is related to the stability of combustion), the combustion temperature itself, the temperature of a vortex-forming flame stabilization device at the outlet of a pre-combustion mixing passage, or temperature at the inlet of the turbine. This is not an exclusive list of the quantities which may be employed in the present invention.

By individual control of each burner in accordance with a combustion characteristic which is specific for the burner, each burner can be made to operate within its stable operation range and to achieve efficient combustion and for low $NO_x$ production.

In accordance with another aspect of the invention, there are provided gas turbine apparatus and a method of control thereof in which the burners are controlled individually, in dependence on at least two sensed quantities relating to the combustion performance of the burners. The sensed quantities may be selected from the quantities mentioned above. It has been found that control in dependence upon at least two such quantities leads to improved burner performance from the point of view of stability and $NO_x$ reduction.

The present inventors have also found that certain quantities relating to the performance of the burners are particularly suited for the individual control of the burners, to improve performance. In accordance with the invention in one aspect, the flame temperature in a combustion chamber of each burner is sensed, and the burners are adjusted individually in accordance with the sensed values of flame temperature towards a predetermined optimum for each burner. In another aspect, in accordance with the invention the temperature of a vortex-forming flame stabilization device provided at the outlet end of a premixing passage or chamber in a premixing combustion stage of each burner is sensed and each burner is individually controlled in dependence upon the sensed value of this temperature. It has been found that this temperature of the flame stabilization device is particularly critical for flame stability.

In yet another aspect of the invention, there is provided separate control of two combustion stages of the burners of the gas turbine apparatus, in particular control of air-fuel ratio of the two stages, in accordance with the value of at least one sensed quantity relating to the combustion performance of the burners. The two combustion stages may be a diffusion combustion stage and a pre-mixing combustion stage, or even two pre-mixing combustion stages where these are provided in the burners. The two combustion stages are controlled separately, but not completely independently since the overall amount of fuel burned is determined by the load of the gas turbine. Improved operation of both combustion stages can be obtained in this manner.

BRIEF INTRODUCTION OF THE DRAWINGS

Embodiments of the invention will now be described by way of non-limitative example, with reference to the accompanying drawings, in which.

DESCRIPTION OF THE PREFERRED EMBODIMENTS

Figure 1:
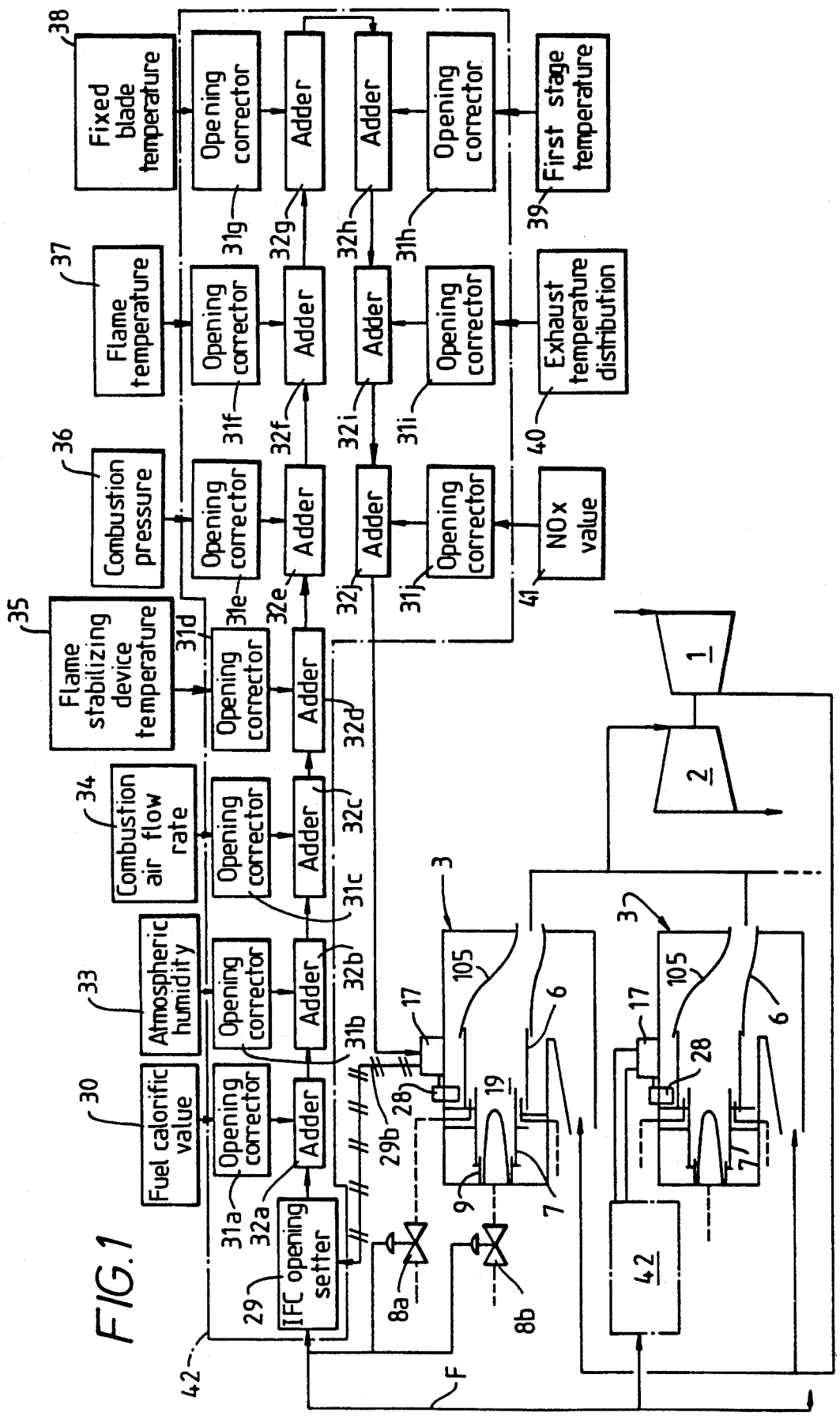
FIG. 1 is a diagram showing the control system of a gas turbine which is a first embodiment of the present invention.

Various embodiments of the present invention will be explained below with reference to FIGS. 1 to 6. In the illustration and explanation of each embodiment, the same reference numeral will be used for the same or equivalent parts and the repetition of explanation will be omitted.

Figure 7:
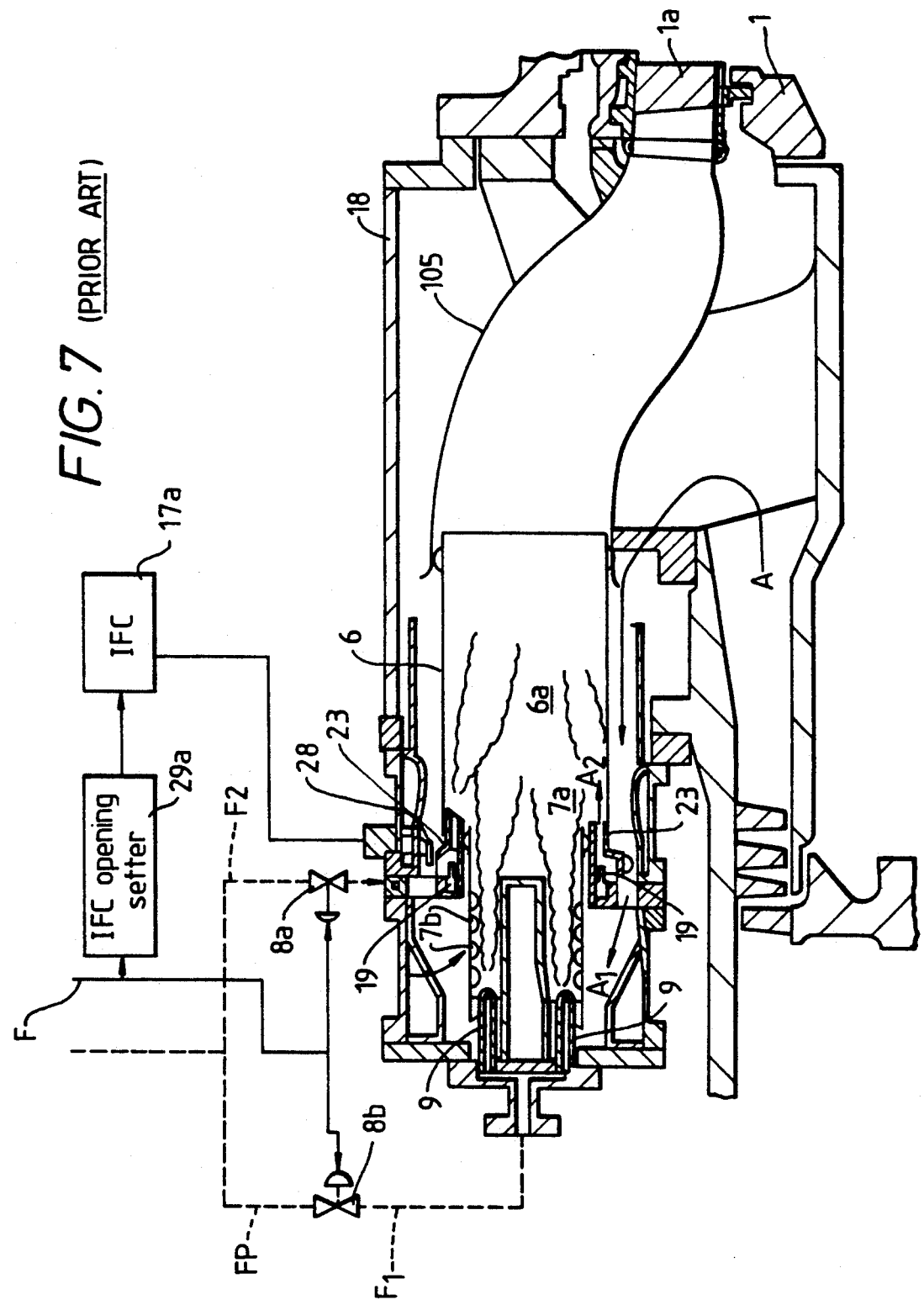
FIG. 7 is a diagrammatic sectional view of a burner disclosed in the prior art.
Figure 8:
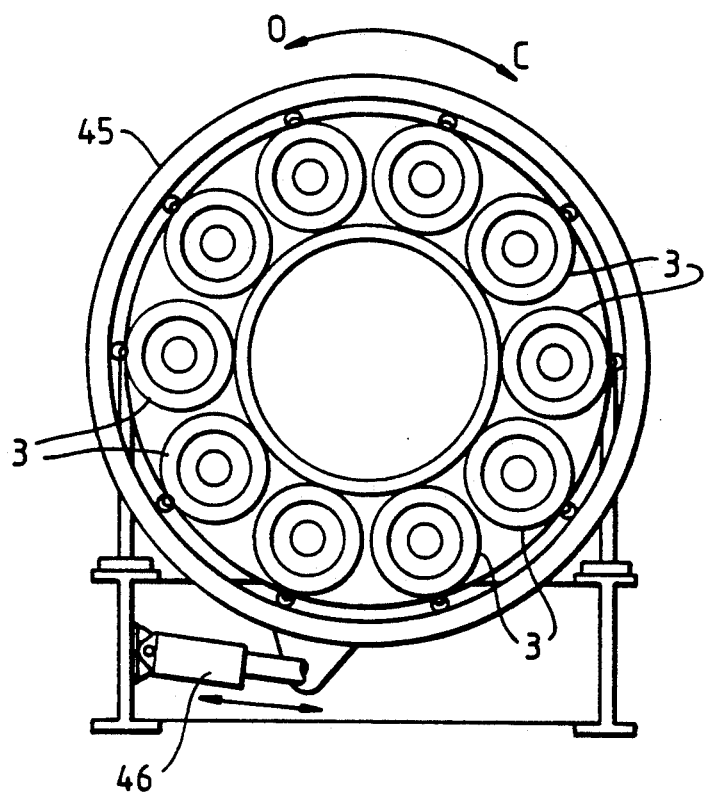
FIG. 8 is a rear view of the burners of the prior art gas turbine.
Figure 9:
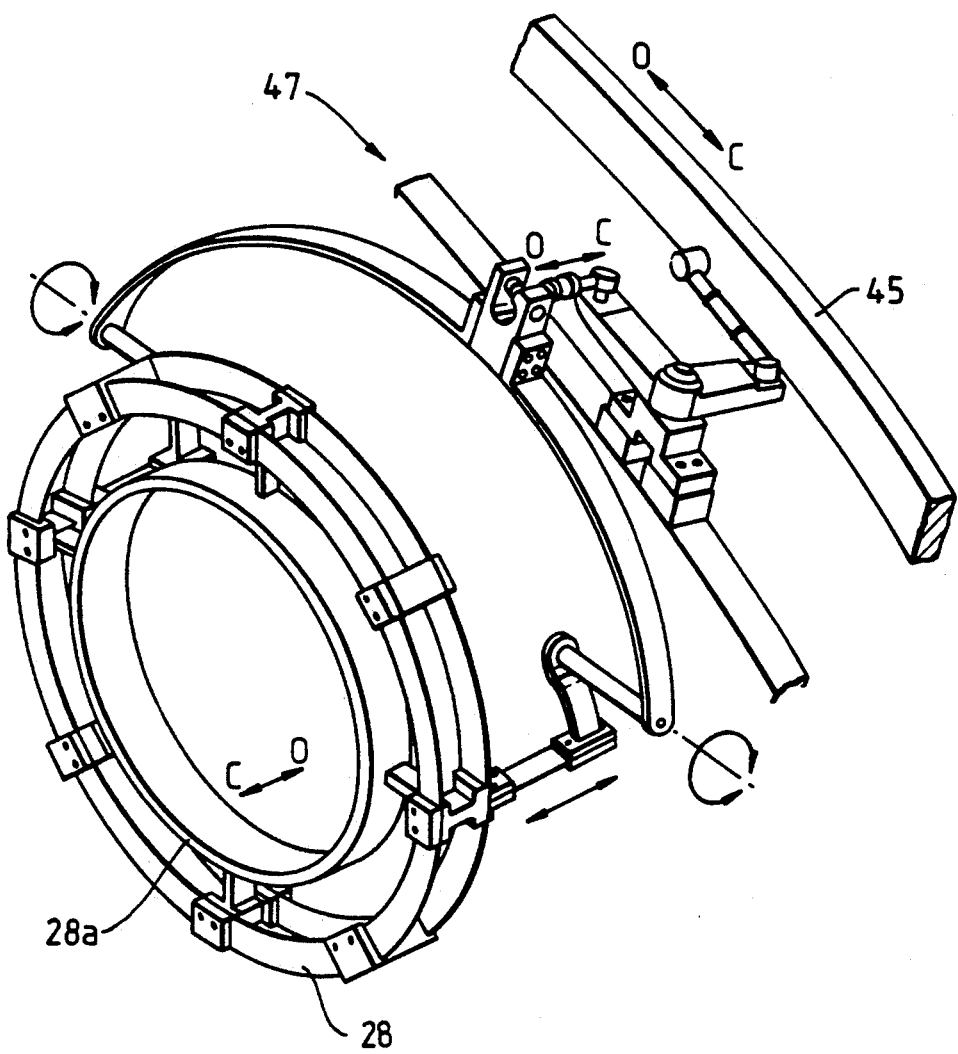
FIG. 9 is a diagrammatic sectional view of another prior art burner of a gas turbine.
Figure 10:
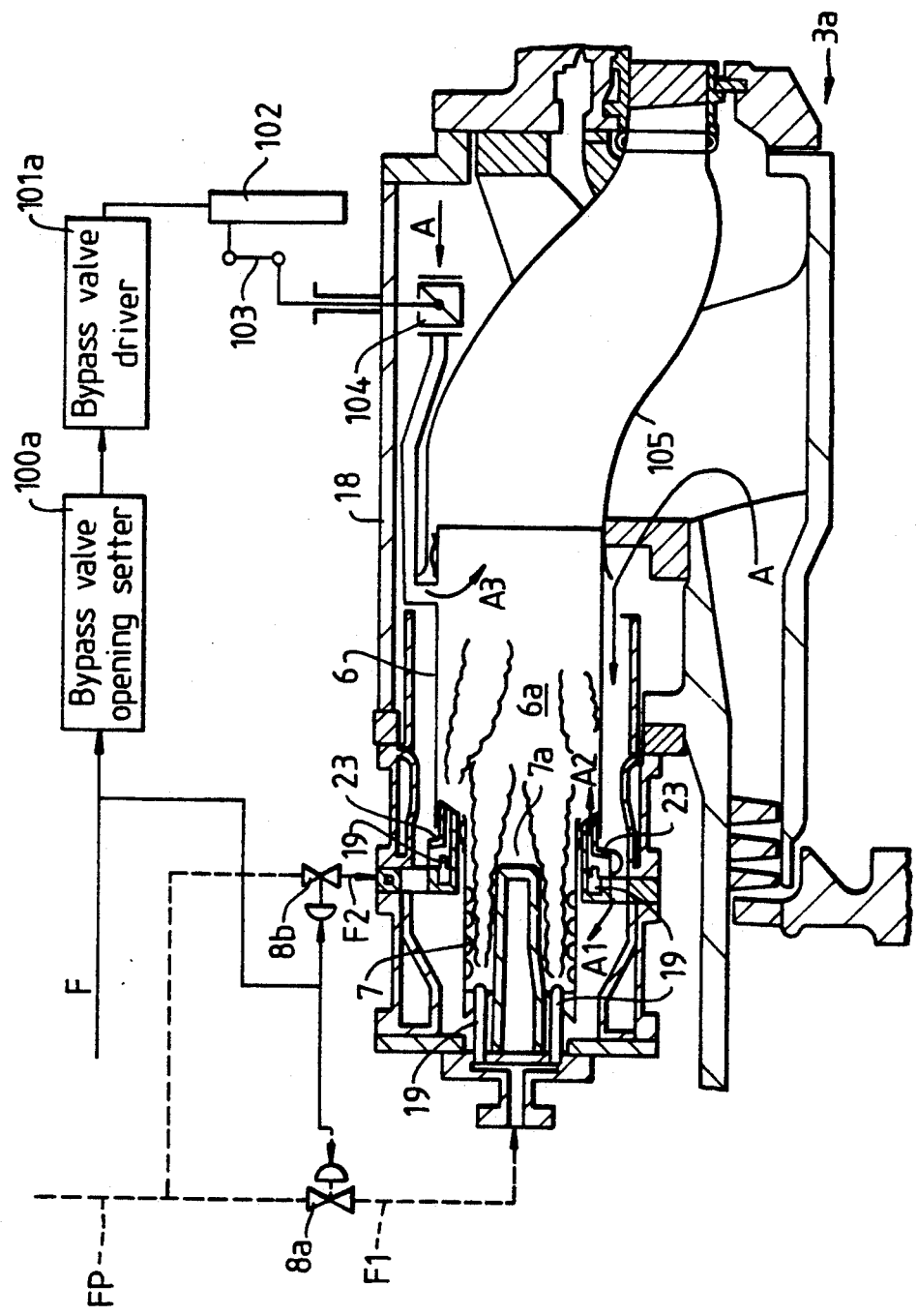
FIG. 10 is a sectional view of another prior art burner.

A first embodiment of a gas turbine according to the present invention will be explained with reference to FIGS. 1 to 3. As shown in FIG. 1, the gas turbine apparatus of this embodiment comprises a gas turbine 2 having a plurality of burners 3, for supplying burned gas to this gas turbine 2, a compressor 1 for supplying compressed air to the plurality of burners 3, and a controller for controlling each device. As shown for example in FIG. 7, the burners 3 are arranged in a ring around the turbine 2 and supply the burned gases to the first stage of the turbine.

Each burner 3 is a two-stage combustion system burner for effecting diffusion combustion at its upstream side and effecting pre-mixing combustion on its downstream side. These modes of combustion are known. As shown in FIGS. 2 and 3, the burner 3 comprises a burner casing 18, an inner cylinder 7 for diffusion combustion which defines a diffusion combustion chamber 7a, an inner cylinder 6 for pre-mixing combustion which defines a pre-mixing combustion chamber 6a, a transition piece 105 for guiding the burned gas produced inside these inner cylinders 6, 7 to the moving blades of the gas turbine 2, diffusion fuel nozzles 9, for injecting a primary fuel F1 into the diffusion combustion chamber 7a, a pre-mixing gas formation chamber 23 for pre-mixing a secondary fuel F2 with combustion air A2, pre-mixing fuel nozzles 19 for injecting the secondary fuel F2 into the pre-mixing gas formation chamber 23, and a movable member 28 for regulating the flow rate of pre-mixing combustion air which is supplied into the pre-mixing gas formation chamber 23 via the inlet 23b.

The burner casing 18 is provided with a flange 20 which divides the burner casing 18 into an upstream part and a downstream part and connects these parts with each other. As shown in FIG. 3, a secondary fuel passage 20b through which the secondary fuel F2 flows and a fuel manifold 20a for distributing the secondary fuel F2 flowing through the secondary fuel passage 20b into a plurality of pre-mixing fuel nozzles 19, are formed in the flange 20.

A flame stabilizing device 21 in the form of a small flange which forms a vortex circulation flow of the combustion gas on the downstream side of itself for stabilizing the pre-mixing combustion is disposed near a pre-mixing gas jet port 23a of the pre-mixing gas formation chamber 23. This pre-mixing gas formation chamber 23 has an annular shape, and a seal spring 24 for sealing the gap between this chamber 23 and the pre-mixing combustion inner cylinder 6 is disposed around the outer periphery of the chamber 23. A seal spring 25 for sealing the gap between the chamber 23 and the diffusion combustion inner cylinder 7 is disposed around the inner periphery of the chamber A swirl plate 22 for swirling the gas passing through the chamber 23 and for mixing the secondary fuel F2 with the pre-mixing combustion air A2 is disposed next to the pre-mixing gas jet port 23a inside the pre-mixing gas formation chamber 23.

An IFC driving device 17 for driving the movable member 28 is connected to the member 28. This IFC driving device 17 is controlled by an IFC controller 42. As shown in FIG. 3, the IFC driving device 17 comprises an AC servo motor 17a, a servo amplifier 17b, a transmission mechanism 17c (e.g. screw mechanism) for converting the rotation of the motor 17a to linear motion and transmitting this motion to the moving member 28 and a differential convertor 17f for detecting the position of the movable member 28 and feeding it back to the IFC controller 42. Instead of the A.C. servo motor 17a, another electric motor such as a D.C. servo motor, a stepping motor, or a linear motor, a hydraulic device such as a hydraulic cylinder, or a hydraulic motor, or a pneumatic device such as an air cylinder, or an air motor, can be used as the driving means of the moving member 28.

Figure 2:
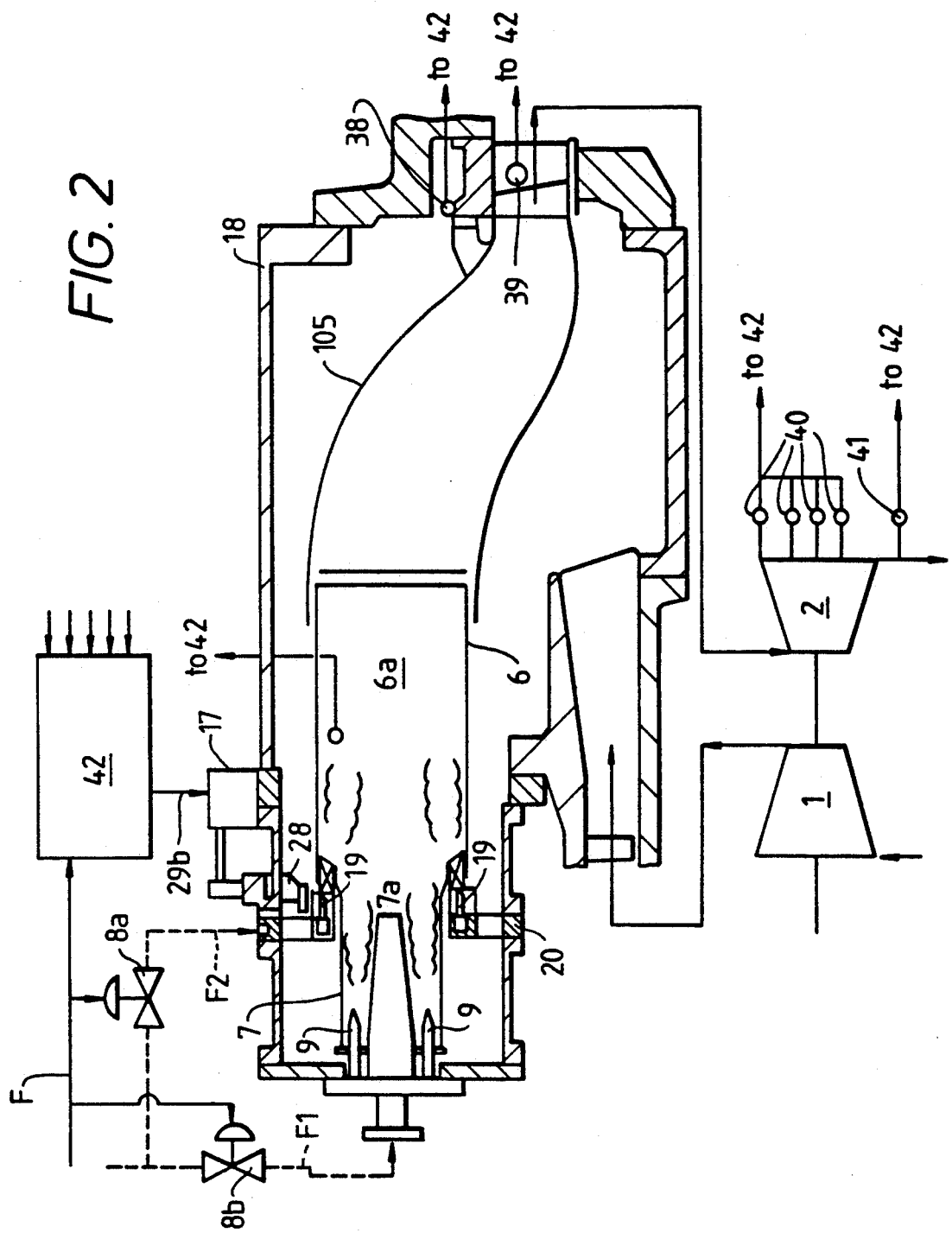
FIG. 2 is a diagram of one burner of the gas turbine of FIG. 1.
Figure 3:
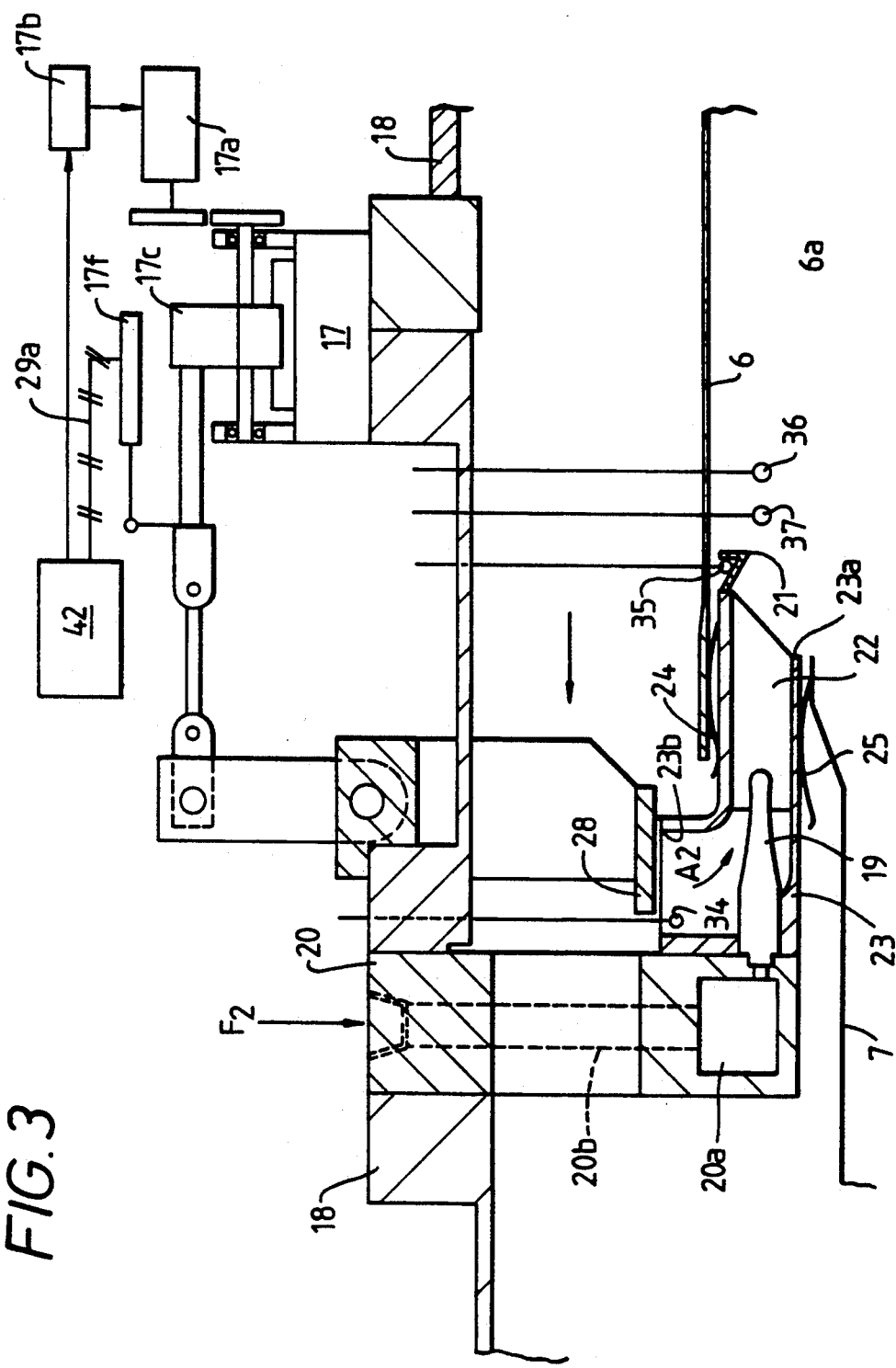
FIG. 3 is a diagrammatic sectional view of the portion of the burner of the first embodiment shown in FIG. 2.

As shown in FIG. 3, each burner 3 is provided with a flow velocity meter 34 for measuring the flow velocity of the pre-mixing combustion air A2 inside the pre-mixing gas formation chamber 23, a thermometer 35 for measuring the temperature of the flame stabilizing device 21, a pressure gauge 36 for measuring the pressure near the pre-mixing gas jet port 23a of the pre-mixing gas formation chamber 23 and a thermometer 37 for measuring the temperature of the pre-mixing flame. As shown in FIG. 2, the gas turbine 2 is provided with a thermometer 38 for measuring the temperature of fixed blades at the entry to the gas turbine downstream of each burner 3, a thermometer 39 for measuring the first stage gas temperature downstream of each burner 3, a plurality of thermometers 40, for measuring the circumferential temperature distribution inside the gas turbine 2 on the downstream side thereof and an $NO_x$ meter 41 for measuring the $NO_x$ value at the outlet of the gas turbine 2.

As shown in FIG. 1, the IFC controller 42 includes an IFC opening setter 29 for determining a reference air flow rate from a reference function of a fuel flow rate necessary for the desired gas turbine load on the basis of a fuel instruction signal representing the gas turbine load so as to set the reference opening value of the movable member 28. The controller 42 also has a plurality of opening correctors 31a, 31b etc. for correcting this reference opening value in dependence on various sensed quantities. An opening corrector 31a determines a correction of the reference opening value of the member 28 on the basis of a measured fuel calorific value 30. An opening corrector 31b determines a correction of the reference opening value on the basis of the humidity of the combustion air measured by an atmosphere hygrometer 33. A corrector 31c determines a correction of the reference opening value on the basis of the flow velocity of the pre-mixing combustion air A2 measured by the flow velocity meter 34. A corrector 31d determines a correction of the reference opening value on the basis of the temperature of the flame stabilizing device 21 measured by the thermometer 35. A corrector 31e determines a correction of the reference opening value on the basis of the combustion pressure measured by the pressure gauge 36, that is, on the basis of the frequency and amplitude of the combustion vibration. A corrector 31f determines a correction of the reference opening value on the basis of the temperature of the pre-mixing flame measured by the thermometer 37. A corrector 31g determines a correction of the reference opening value on the basis of the temperature of the fixed blades measured by the thermometer 38. A corrector 31h determines a correction of the reference opening value on the basis of the first stage gas temperature measured by the thermometer 39. A corrector 31*i* determines a correction of the reference opening value on the basis of the temperature distribution on the downstream side inside the gas turbine 2 measured by the thermometers 40. A corrector 31*j* determines a correction of the reference opening value on the basis of the $NO_x$ value at the outlet of the gas turbine 2 measured by the $NO_x$ meter 41.

Each opening corrector 31*a* . . . 31*f* has stored in it a predetermined characteristic of the burner 3, which relates the variation of the respective sensed quantity to the pre-mixing air flow rate. Thus the correction performed to the opening value of the member 28 by each respective corrector 31*a* . . . 31*f* is aimed to optimize the respective sensed quantity for optimal performance of the burner. Adders 32*a*, 32*b*, . . . , 32*j* add the corrections outputted from these correctors 31*a*, . . . , 31*j* to the reference opening value of the movable member 28.

One of these IFC controllers 42 and IFC driving devices 17 are provided for each burner 3.

In this embodiment, flow rate calculation means comprises the IFC controller 42 which indirectly determines the flow rate of the pre-mixing combustion air A2, and the flow regulation means comprises the movable member 28 and the IFC driving device 17. Reference fuel-air ratio setting means comprises the IFC opening setter 29 which indirectly determines the reference fuel-air ratio, and correction means comprises correctors 31*a*, . . . , 31*j* and adders 32*a*, . . . , 32*j*.

Next, the operation of this embodiment will be explained.

When the fuel instruction signal is outputted, the valve opening of each of fuel flow rate regulation valves 8*a*, 8*b* of the burners 3, is set so that the fuel whose flow rate corresponds to the turbine load represented by the fuel instruction signal is supplied to each burner 3.

In the IFC controller 42 of each of the burners 3, on the other hand, the IFC opening setter 29 which receives the fuel instruction signal determines the reference air quantity from the reference function of the fuel flow rate necessary for the gas turbine load and sets the reference opening value of the member 28. The correctors 31*a*, . . . , 31*j* and the adders 32*a*, . . . , 32*j* correct this reference opening value and output the corrected opening value to the IFC driving device 17.

The IFC driving device 17 moves the movable member 28 on the basis of this corrected opening value, and the pre-mixing combustion air A2 enters the pre-mixing gas formation chamber 23 at an optimum flow rate.

To stably burn the fuel and to limit $NO_x$ to a low level, it is necessary to accurately employ control variables such as the properties of the fuel, weather, combustion state, and so forth. Since this embodiment measures the calorific power of the fuel, the humidity of the atmosphere, the $NO_x$ value, etc, as described above and controls the opening value of the member 28 on the basis of these values, stable combustion can be accomplished and the reduction of $NO_x$ can be attained. The measured quantities are the same for all the burners 3, of course. More specifically, if the combustion ratio of the fuel decreases during the operation due to the change of the atmospheric humidity, for example, the reference movable piece opening increases, so that blow-out can be prevented. When the fuel ratio of the fuel increases because of the change of the atmospheric humidity, the reference movable piece opening decreases, so that $NO_x$ is limited to a lower level and back-firing can be prevented, as well.

In this embodiment, the movable member opening value is corrected for each burner 3, on the basis of the flow velocity of the pre-mixing combustion air A2, the temperature of the flame stabilizing device 21, the temperature of the pre-mixing flame, the temperature of the fixed blades of the turbine, the temperature of the first stage, etc, that are all measured for each burner 3, and the pre-mixing combustion air A2 is supplied at an optimum flow rate to each burner 3. Accordingly, the pre-mixing combustion air A2 can be supplied in accordance with the difference of performance of the individual burners 3. For this reason, optimum control can be achieved for each burner 3, and stable combustion and low $NO_x$ combustion can be accomplished by all the burners.

In this embodiment, it is preferred that diffusion combustion is mainly effected at the start-up of the turbine, and pre-mixing combustion is mainly effected during the steady operation at above a specific load. Therefore, increase in $NO_x$ hardly occurs even when the flow rate of the diffusion combustion air A1 supplied to the diffusion combustion chamber 7*a* is not corrected, in the same manner as the pre-mixing air flow rate, as described above.

The flow-controlling member 28 is relatively small. Unlike the prior art technique construction described above, this embodiment does not use a control ring which is common for all burners and therefore is large in scale, has a large inertia and has a large thermal expansion and does not use a complicated link mechanism for connecting the control ring to the movable piece. Therefore, this embodiment can provide improved accuracy of positioning of the movable piece and the control response characteristics.

Though this above embodiment illustrates the case where the present invention is applied to the two-stage combustion system burner, the present invention can of course be applied to a single stage burner or burners having three or more stages.

Figure 4:
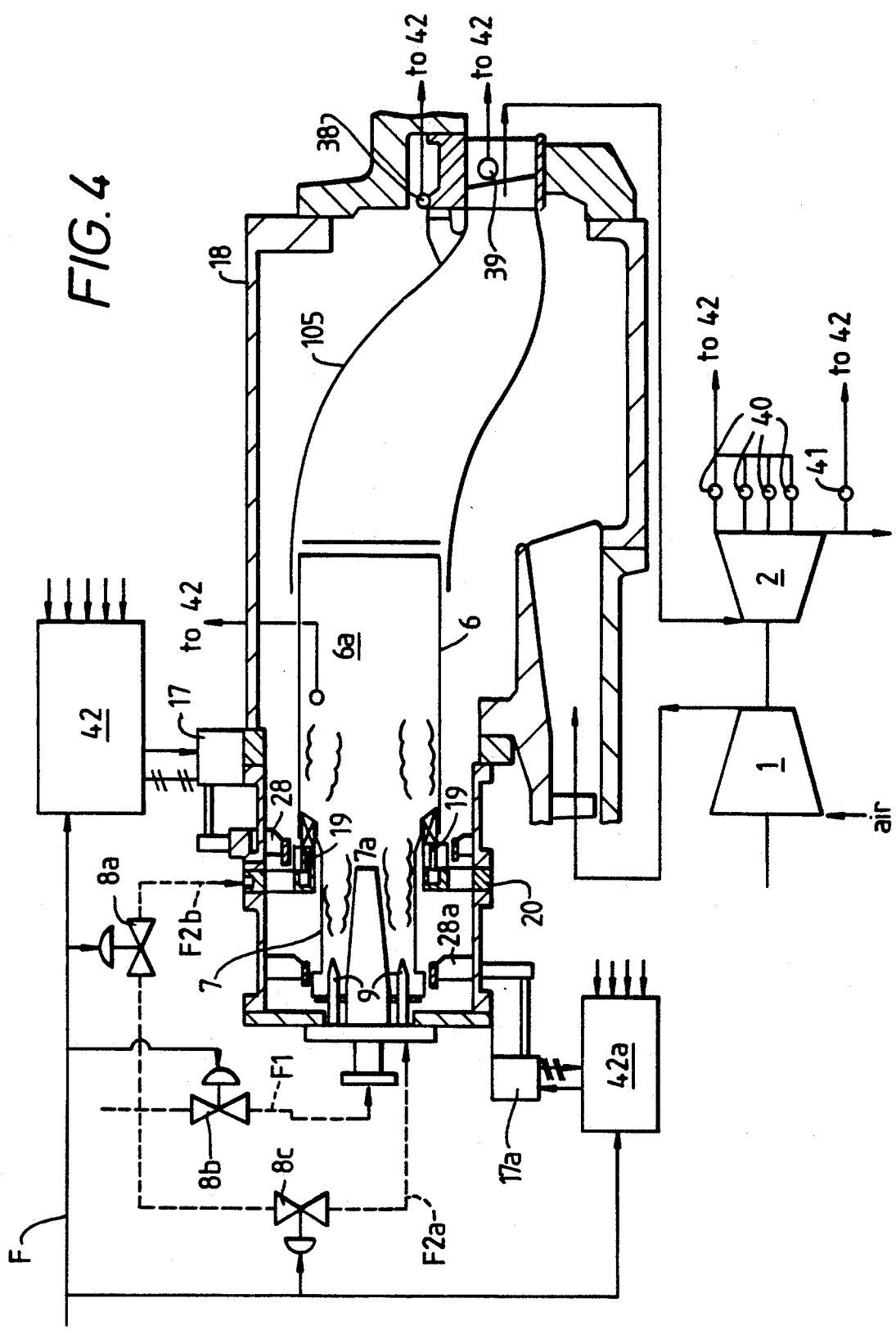
FIG. 4 is a view, similar to that of FIG. 2, of a burner and its control, in an alternative embodiment of the invention.

Though the above embodiment corrects only the flow rate of the pre-mixing combustion air supplied to the pre-mixing gas formation chamber 23, the flow rate of the diffusion combustion air A1 supplied to the diffusion combustion chamber 7*a* may also be corrected in an analogous manner. FIG. 4 illustrates this embodiment and additionally the case where there are two premixing combustion stages having separate air-flow control in accordance with the invention.

In FIG. 4, a ring-shaped movable member 28*a*, similar to the movable member 28 and moved by a similar mechanism 17*a* is arranged to control the air flow rate for the diffusion combustion stage, i.e. the air flow rate to the inner cylinder 7. The opening value of the member 28*a* is calculated and set by the IFC controller 42*a*, which is similar in principle to the IFC controller 42 for the pre-mixing combustion air flow rate control. The controller 42*a* receives as input information the desired fuel supply rate signal and determines the opening value for the member 28*a* from that and from sensed information relating to the actual performance of the burner 3. The inputs of sensed information to the controller 42*a* are generally the same as to the controller 42 of FIGS. 1 and 4, adapted to the fact that the diffusion combustion air flow is controlled in this case. The sensors required are not shown in FIG. 4. The diffusion combustion air flow rate of each burner 3 of the gas turbine is controlled individually in this manner.

In the embodiment of FIGS. 1-3, there is one IFC controller 42 for each burner 3, and in FIG. 4 two IFC controllers 42, 42a for each burner. Suitably, the IFC controller is data processing means. It is alternatively possible to use one computer instead of these IFC controllers 42, 42a for example, and to set the movable member opening values for the burners 3, individually using the single computer.

FIG. 4 also shows that in this embodiment there are two premixing combustion stage fuel flows F2a and F2b, for the two premixing combustion stages respectively. The flow passages and burner nozzles etc. for the first premixing combustion stage (fuel flow F2a) are not shown, but this stage has a controller operating in the same manner as the controller 42 of FIG. 1. The controller 42 shown in FIG. 4 for the fuel flow F2b for the second premixing combustion stage is identical to the corresponding controller 42 of FIG. 1.

Figure 5:
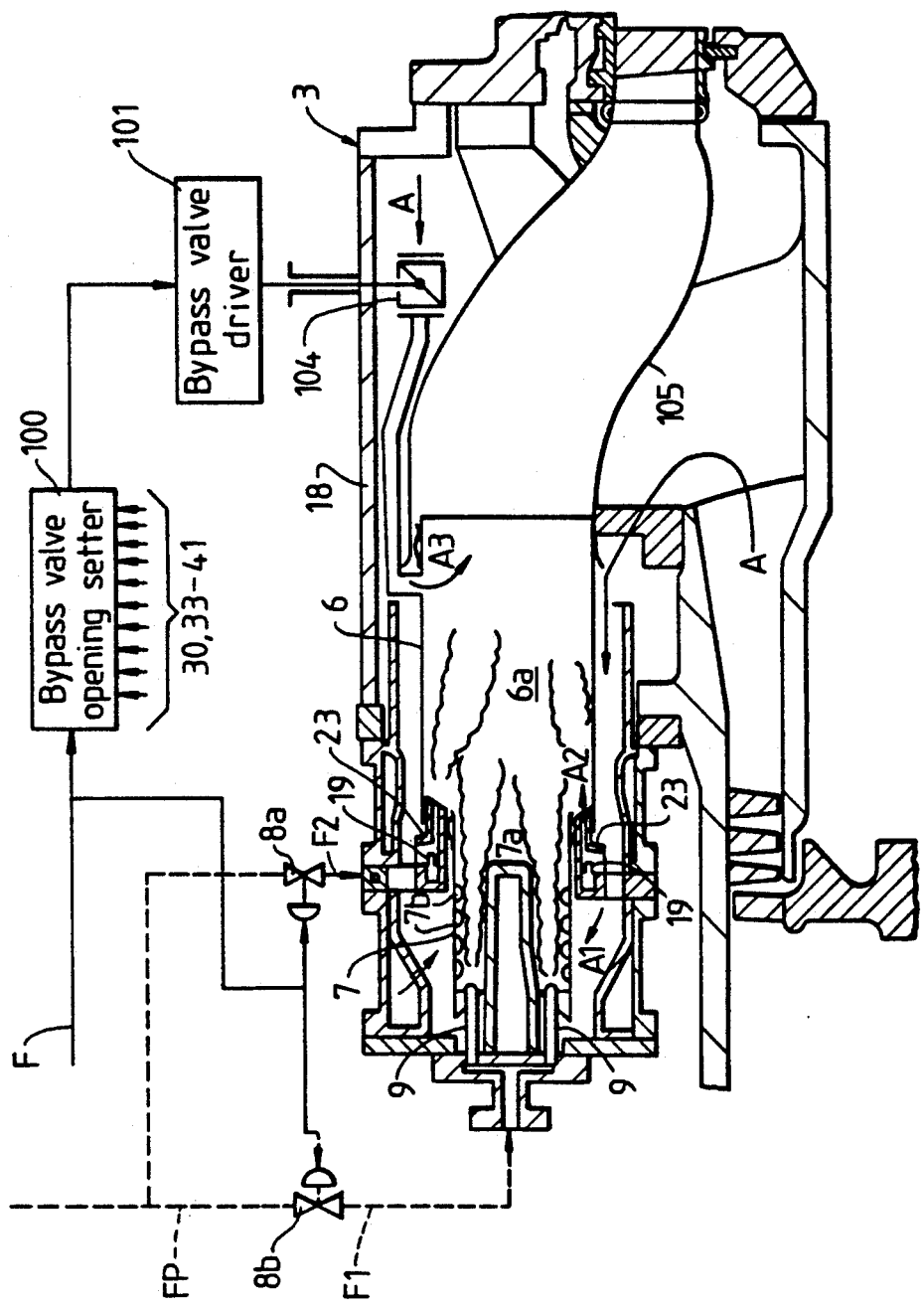
FIG. 5 is a diagram of one burner of a gas turbine which is a third embodiment of the present invention.

Next, a third embodiment of the gas turbine according to the present invention will be explained with reference to FIG. 5. In this construction, for changing the distribution of air inside the burner 3, a bypass valve 104 is arranged to send part of the combustion air supplied to the space between the burner casing 18 and the transition piece 105 into the transition piece 105, and this bypass valve 104 changes the fuel-air ratio inside the transition piece 105.

In this embodiment, a bypass valve opening setter 100 and a bypass valve driving device 101 are provided for each burner 3a of the plurality of burners 3a of the gas turbine, and the flow rate of excess air A3 supplied into the transition piece 105 through the bypass valve 104 is regulated individually for each burner 3a. In this case also therefore, excess air A3 can be supplied to each burner 3a, at the appropriate flow rate regulated for each burner 3a.

The by-pass value opening setter 100 controls the driving device 101 in dependence on the fuel supply signal F and also on a plurality of sensed conditions 30, 33-41 relating to the performance of the burner. These sensed conditions 30, 33-41 are the same as in the embodiment of FIGS. 1-3, and the calculation of the opening value of the valve 104 is performed in an analogous manner, in dependence on known characteristics of each individual burner.

Figure 6:
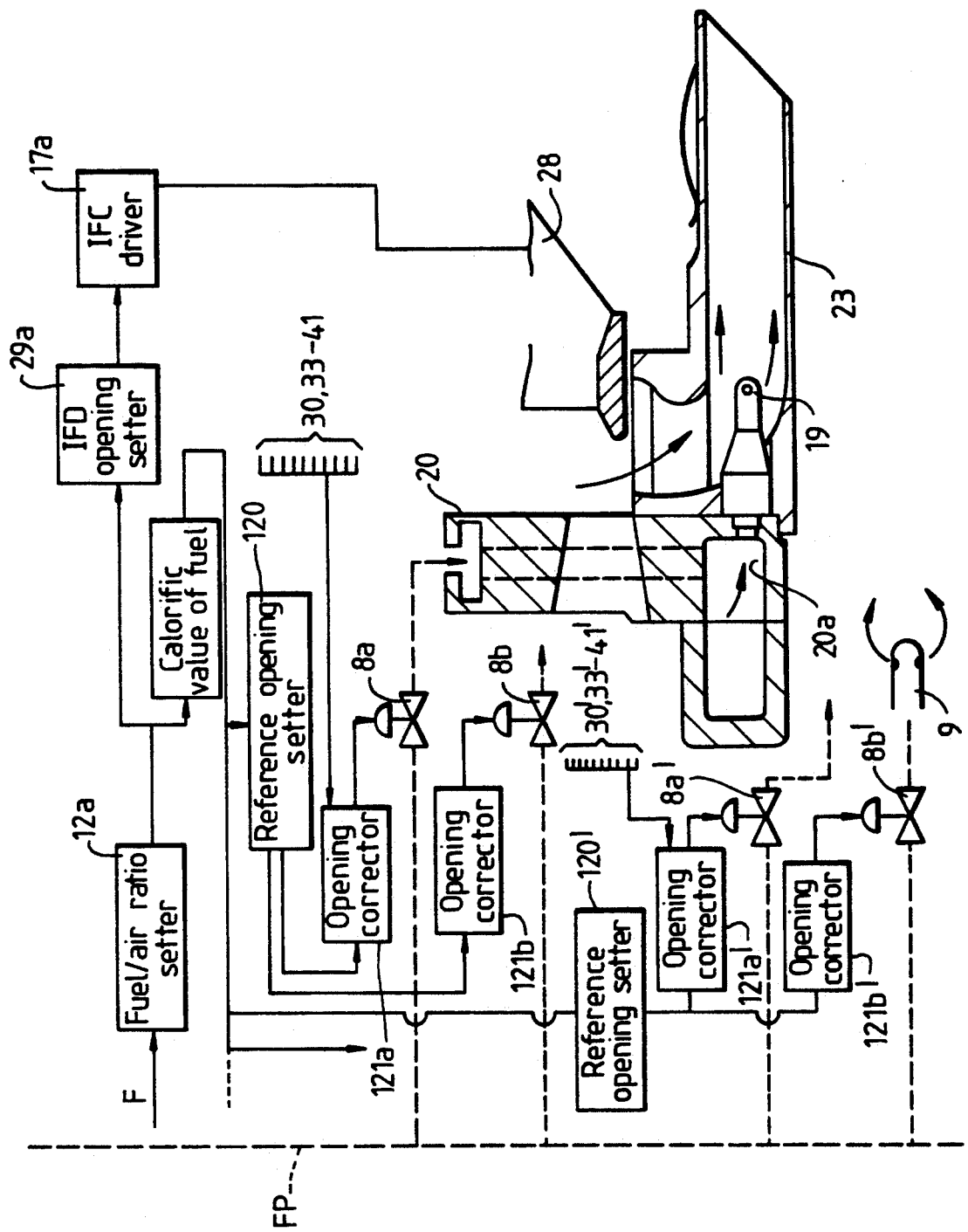
FIG. 6 is a control block diagram for a gas turbine which is a fourth embodiment of the present invention.

The foregoing embodiments are the cases where only the flow rate of combustion air is regulated in order to adjust the fuel-air ratio. However, in alternative embodiments, only the fuel flow rate may be regulated or the flow rate of combustion air and the fuel flow rate may be regulated in a similar manner for each burner. The case where only the fuel flow rate is regulated will be explained as the fourth embodiment shown in FIG. 6. FIG. 6 illustrates the control of the fuel flow rates to the pre-mixing fuel nozzles 19 and to the diffusion nozzles 9, in a burner of the same construction as shown in FIGS. 1-3.

In this embodiment, a reference opening setter 120 for setting a reference opening value of a pre-mixing fuel flow rate regulating valve 8a and a diffusion fuel flow rate regulating valve 8b is provided for each burner 3, and two opening correctors 121a, 121b are disposed for correcting the reference opening value for each regulating valve 8a, 8b which is set by this reference opening setter 120. Data relating to each regulating valve 8a, 8b and the differences of the components of the fuel are in advance set in each opening corrector 121a, 121b. The opening corrector 121a adjusts the fuel flow rate setting to the nozzles 19 in dependence on the same sensed characteristics 30, 33-41 as in the embodiment of FIG. 1, as well as the known performance characteristics of the burner 3. Likewise, the opening corrector 121b adjusts the fuel flow rate setting to the nozzles 9 in dependence on inputs relating to sensed conditions relating to the actual performance of the burner and predetermined characteristics of the burner, similar to the inputs to the opening corrector 121a but adapted to the diffusion combustion stage.

The IFC opening setter 29a and the IFC driving device 17a used in this embodiment for the air flow rate to the pre-mixing combustion are the same as those of the prior art. In other words, the IFC opening setter 29a determines indiscriminately the IFC opening without discriminating among the burners 3, and the IFC driving device 17a is equipped with a control ring for nondiscriminately moving the movable member 28 of each burner 3.

FIG. 6 shows also the reference opening setter 120' and the opening correctors 121a', 121b' for the fuel valves 8a', 8b' of a second burner of the same gas turbine, which is controlled in the same manner.

In the embodiment, the fuel can be supplied at the optimum flow rate to each burner 3, individually and for each stage of each burner individually. This embodiment can achieve fundamentally the same effect as that of the first embodiment due to the provision of the reference opening setter 120 and the opening correctors 121a, 121b. Therefore, removal of the common control ring for the pre-mixing combustion, etc, is not necessary, so that modification cost can be lower than in the first embodiment when the present invention is applied to existing equipment.

According to the present invention, therefore, the supply flow rate(s) of the combustion air and/or of the fuel can be regulated optimally for each burner. Therefore, the combustion of each burner can take place under most suitable conditions. Since the fuel-air ratio is corrected on the basis of various external factors, combustion can be accomplished at a suitable fuel-air ratio corresponding to the variation of the external factors and to the individual difference of each portion of the burner. Accordingly, stable and low $NO_x$ combustion can be achieved.

We claim:

1. A gas turbine apparatus having a gas turbine, a plurality of burners for providing combustion gas to drive said turbine, flow control means of each said burner for at least one of fuel and combustion air, and control means for adjusting said flow control means of each said burner individually in dependence on a predetermined combustion characteristic of each respective burner relating at least one of the fuel and combustion air to the burner to change in desired turbine load, wherein said flow control means controls the flow of at least combustion air and comprises a movable member for regulating air flow rate, an electric servo motor mounted on a burner casing and electrically connected to said control means, a transmission mechanism mechanically connected to said servo motor and said movable member for converting rotation of said servo motor into linear motion and transmitting the linear motion to said movable member, and means for detecting the position of said movable member and feeding the detected position back to said control means.

2. A gas turbine apparatus according to claim 1, having means for sensing at least one quantity relating to the combustion performance of the burners, and wherein said control means is adapted to adjust said flow control means of each said burner in dependence on said sensed quantity and said predetermined combustion characteristic of the respective burner.

3. A gas turbine apparatus according to claim 2, wherein said at least one sensed quantity is selected from the group consisting of:
calorific value of fuel being fed to said burners,
humidity of combustion air being fed to said burners and
nitrogen oxide concentration downstream of said gas turbine.

4. A gas turbine apparatus according to claim 1, having means for sensing said at least one quantity relating to the combustion performance of each respective burner, and wherein said control means is adapted to adjust said flow control means of each said burner in dependence on the value of said sensed quantity for the respective burner and said predetermined combustion characteristic of the respective burner.

5. A gas turbine apparatus according to claim 4, wherein said at least one sensed quantity is selected from the group consisting of:
combustion air flow rate of at least one combustion stage of said burner,
temperature of a vortex-forming flame stabilizing device at the outlet of a pre-mixing passage of said burner,
combustion pressure in said burner,
flame temperature in said burner,
fixed blade temperature of said gas turbine downstream of said burner,
gas temperature at a first stage of said gas turbine downstream of said burner, and
exhaust gas temperature resulting from said burner.

6. A gas turbine apparatus having a gas turbine, a plurality of burners for providing combustion gas to drive said turbine, flow control means of each said burner for at least one of fuel and combustion air, sensing means for sensing at least two quantities relating to the combustion performance of said burners, and control means for adjusting said flow control means of each said burner individually in dependence on said at least two of said sensed quantities, wherein said flow control means controls the flow of at least combustion air and comprises a movable member for regulating air flow rate, an electric servo motor mounted on a burner casing and electrically connected to said control means, a transmission mechanism mechanically connected to said servo motor and said movable member for converting rotation of said servo motor into linear motion and transmitting the linear motion to said movable member, and means for detecting the position of said movable member and feeding the detected position back to said control means.

7. A gas turbine apparatus according to claim 6, wherein said at least two sensed quantities are selected from the group consisting
calorific value of fuel being fed to said burners,
humidity of combustion air being fed to said burners,
nitrogen oxide concentration downstream of said gas turbine,
combustion air flow rate of at least one combustion stage of the respective burner,
temperature of a vortex-forming flame stabilizing device at the outlet of a pre-mixing passage of the respective burner,
combustion pressure in the respective burner,
flame temperature in the respective burner,
fixed blade temperature of said gas turbine downstream of the respective burner,
gas temperature at a first stage of said gas turbine downstream of the respective burner, and
exhaust gas temperature resulting from the respective burner.

8. A gas turbine apparatus according to claim 6, wherein at least one of said two sensed quantities is measured individually for each said burner, and said control means is arranged to adjust each respective burner individually in dependence on the respective value of said individually sensed quantity for said burner.

9. A gas turbine apparatus having a gas turbine and a plurality of burners for providing combustion gas to drive said turbine, flow control means of each said burner for at least one of fuel and combustion air, each said burner having a plurality of combustion stages comprising a first combustion stage and a second combustion stage, and said apparatus further having sensing means for sensing at least one quantity relating to the combustion performance of said burners and control means for controlling said flow control means for combustion air in said first combustion stage and said second combustion stage separately in dependence on sensed values of said at least one quantity.

10. A gas turbine apparatus according to claim 9, wherein said plurality of combustion stages comprises a diffusion combustion stage and at least one fuel and combustion air pre-mixing combustion stage.

11. A gas turbine apparatus according to claim 9, wherein said at least one sensed quantity is selected from the group consisting of
calorific value of fuel being fed to said burners,
humidity of combustion air being fed to said burners,
nitrogen oxide concentration downstream of said gas turbine,
combustion air flow rate of at least one combustion stage of each said burner,
temperature of a vortex-forming flame stabilizing device at the outlet of a pre-mixing passage of each said burner,
combustion pressure in each said burner,
flame temperature in each said burner,
fixed blade temperature of said gas turbine downstream of each said burner,
gas temperature at a first stage of said gas turbine downstream of each said burner, and
exhaust gas temperature resulting from each said burner.

12. A method of controlling a gas turbine apparatus having a gas turbine and a plurality of burners supplying combustion gases thereto, wherein each said burner has at least a first combustion stage and a second combustion stage, said method comprising during operation sensing at least one quantity related to combustion performance of said burners and adjusting combustion air flow rates in said first and second combustion stages of said burners separately on the basis of said sensed quantity.

* * * * *